(12) United States Patent
Ray et al.

(10) Patent No.: US 7,254,093 B2
(45) Date of Patent: Aug. 7, 2007

(54) OCEAN BOTTOM SEISMOMETER PACKAGE WITH DISTRIBUTED GEOPHONES

(75) Inventors: Clifford H. Ray, Fulshear, TX (US); Glenn D. Fisseler, Houston, TX (US)

(73) Assignee: Fairfield, Industries, Inc., Sugar Land, TX (US)

( * ) Notice: Subject to any disclaimer, the term of this patent is extended or adjusted under 35 U.S.C. 154(b) by 0 days.

(21) Appl. No.: 10/848,293

(22) Filed: May 18, 2004

(65) Prior Publication Data

US 2005/0259516 A1 Nov. 24, 2005

(51) Int. Cl.
*G01V 1/16* (2006.01)

(52) U.S. Cl. .................. 367/188; 367/178; 181/122

(58) Field of Classification Search ........... 367/178, 367/188; 181/122
See application file for complete search history.

(56) References Cited

U.S. PATENT DOCUMENTS

| 4,144,520 | A |   | 3/1979  | McNeel |
|-----------|---|---|---------|--------|
| 4,300,220 | A | * | 11/1981 | Goff et al. .................. 367/188 |
| 4,422,164 | A | * | 12/1983 | Bowden et al. ............... 367/15 |
| 4,525,819 | A |   | 6/1985  | Hefer |
| 4,813,029 | A | * | 3/1989  | Erich, Jr. et al. ........... 367/188 |
| 4,839,872 | A |   | 6/1989  | Gragnolati et al. |
| 5,010,531 | A |   | 4/1991  | McNeel |
| 5,119,345 | A |   | 6/1992  | Woo et al. |
| 5,163,028 | A |   | 11/1992 | Barr et al. |
| 5,189,642 | A |   | 2/1993  | Donoho et al. |
| 5,214,614 | A | * | 5/1993  | Baule .......................... 367/178 |
| 5,231,252 | A |   | 7/1993  | Sansone |
| 5,274,605 | A |   | 12/1993 | Hill |
| 5,469,408 | A |   | 11/1995 | Woo |
| 5,500,832 | A |   | 3/1996  | Berryhill |
| 5,548,562 | A |   | 8/1996  | Helgerud et al. |

(Continued)

FOREIGN PATENT DOCUMENTS

WO    WO 2004/031807 A1 *   4/2004

OTHER PUBLICATIONS

Seabed Geophysical AS, "Case, CAble-less SEismic System".

(Continued)

*Primary Examiner*—Ian J. Lobo
(74) *Attorney, Agent, or Firm*—Mark A. Tidwell, Esq.; Jackson Walker, L.L.P.

(57) ABSTRACT

A seismic data collection unit having multiple separate geophones/geophone packages positioned in a housing wherein the geophones are offset from a vertical axis so that summing of the geophones' respective outputs minimizes certain noise in the unit's output. Specifically, the offset geophones are physically positioned or mathematically configured so as to be symmetrical about a selected vertical axis in order to cancel out certain noise in a seismic signal. The particular placement of the geophones within the housing is preferably selected so that the vertical axis around which the geophones are positioned passes through the center of gravity of the unit.

24 Claims, 2 Drawing Sheets

U.S. PATENT DOCUMENTS

| | | |
|---|---|---|
| 5,623,455 A | 4/1997 | Norris |
| 5,724,241 A | 3/1998 | Wood et al. |
| 5,761,152 A | 6/1998 | Jacobsen et al. |
| 6,024,344 A | 2/2000 | Buckley et al. |
| 6,070,129 A | 5/2000 | Grouffal et al. |
| 6,307,808 B1 * | 10/2001 | Schmidt .................... 367/178 |
| 6,366,537 B1 * | 4/2002 | Sambuelli et al. .......... 367/178 |
| 6,532,190 B2 | 3/2003 | Bachrach |
| 6,584,406 B1 * | 6/2003 | Harmon et al. ................ 702/6 |
| 2002/0152031 A1 | 10/2002 | Jones |

OTHER PUBLICATIONS

Geopro GmbH, "WARRP Offshore" Mar. 2002.
Dr. Thomas Buttgenbach, Klas Schleisiek, "4-C System Goes Ultradeep" Jan. 2002.
Thales Underwater Systems, "Reservoir Monitoring Solutions" Jan. 2003.
Kum OBS Systems—4C/4D Deep Sea Exploration Equipment & Components for Seabed Systems.

* cited by examiner

OCEAN BOTTOM SEISMOMETER PACKAGE WITH DISTRIBUTED GEOPHONES

BACKGROUND OF THE INVENTION

The present invention relates to the field of seismic exploration. More particularly, the invention relates to an apparatus for seismic exploration, and most particularly to marine seismic exploration utilizing ocean bottom seismometer systems.

Seismic exploration systems placed on the ocean bottom floor have been in use for many years. These devices are typically referred to as "OBC" (Ocean Bottom Cabling) or "OBS" (Ocean Bottom Seismometer) systems. The prior art has centered on three main groups of ocean bottom apparatus to measure seismic signals at the seafloor. The first type of apparatus is an OBC system, similar to the towed streamer, which consists of a wire cable that contains geophones and/or hydrophones and which is laid on the ocean floor, where the detector units are interconnected with cable telemetry.

A second type of recording system is comprised of OBS units, each of which has a seismic sensor and electronics package that are anchored to the sea floor. The unit digitizes the seismic signals and typically transmits the seismic data via cable telemetry up to a radio unit floating on the water surface. The floating transmitter unit then transmits the data to a surface vessel where the seismic data are recorded. Multiple OBS units of this type are typically deployed in a seismic survey.

A third type of ocean bottom seismic recording system is comprised of OBS units known as Seafloor Seismic Recorders (SSR's). Each SSR unit is similar to the OBS units described in the preceding paragraph, but also houses onboard recording devices and records seismic data onboard the unit while it is deployed on the seafloor. Data are retrieved by retrieving the units from the seafloor. Such units are typically reusable. The focus of the present invention is on SSR type of OBS units.

More specifically, SSR type OBS units generally include one or more geophone and/or hydrophone sensors, a power source, a seismic data recorder, a crystal oscillator clock, a control circuit, and, in instances when gimbaled geophones are used and shear data are recorded, a compass or gimbal. Except to the extent power is provided from an outside source via an umbilical cord or cable, the power source is generally a battery package. In most cases, these various components are distributed between distinct and separate packages that comprise the SSR unit, namely a sensor package and a control package, both of which are mounted on some type of frame or skid. Typically, the control package houses a power source, recording device and control electronics for the SSR unit while the sensor package houses a single or three component geophone centrally secured within the housing. The sensor package is hard wired to the control package in order to transmit seismic data detected by the sensor package to the control package for recording. In some cases, an SSR unit may have multiple separate geophone packages, each cabled to a control package so as to form a geophone array. In all cases, however, each geophone, whether single component or multicomponent, is centrally secured within a high pressure resistant housing.

It is well known in the art that multiple factors associated with OBS package and its coupling characteristics can distort, add noise or otherwise degrade sensing the true acoustic responses of the earth. These factors may include 1) near surface waves which may cause a "rocking" motion of the unit thereby producing undesirable energy, 2) shear wave energy which may cause a "rocking" motion of the unit related to the package height and the shear force acting on the base of the unit against the resistance of the water, all of which combine to produce undesirable cross coupling shear energy (it appears that softer sediments tend to accentuate this type of distortion), 3) ocean currents which can produce extraneous energy and noises, and 4) various random noises such as sea creature noises, natural noises or "manmade" noises, all of which can contaminate the desired true responses. For these reasons, it is common to separate an OBS unit's control package from the unit's sensor package.

More specifically, the SSR units of the prior art, and in particular, the housings containing the power, control and recording components of a unit, are characterized by relatively large profiles. This is principally true because OBS units must employ larger spherical or cylindrical shaped housings having large cross-sections to counter the high pressure environments in which the OBS units are deployed. Thus, to avoid noise associated with these housings, and their coupling to the earth, it has been desirable in prior art OBS units to separate the geophones from any large profile housing containing other components of the unit. In this regard, the geophones are typically housed in small packages containing primarily only the geophones. The profile of these geophone packages is very small in comparison to the larger control housing.

It is also common practice in the art to minimize cross coupling problems by rigidly fixing an OBS unit's geophone—whether single or multi component—at the vertical axis of symmetry of the unit package, between the center of buoyancy and the center of mass of the unit. By securing a unit's geophone at the center of gravity of the unit, noise and other unwanted effects of rocking or similar motion, which are most pronounced at the periphery of the unit, are minimized.

Of course, because of the practice of positioning a geophone at the center of gravity of a housing, the sensor housing for a prior art OBS unit only contains one geophone/geophone set, whether it is a single component geophone that measures signals in only one dimension or a three component geophone that measures signals in three dimensions. This also has the result of limiting the position of other components around the geophones. Specifically, the available space between the centrally positioned geophone and the casing walls dictates the physical size of the components that can be incorporated in a unit. In this same vein, any components that are incorporated within a package must be positioned so that the overall package exhibits an acceptable center of gravity.

Various attempts have been made to address some of the above-mentioned drawbacks. For example, a seafloor seismic recorder is described in U.S. Pat. No. 5,189,642. This patent discloses an elongated, upright chassis formed of spaced apart, horizontal ring plates connected by vertical leg members. Each leg member is formed of nested tubes that can slide relative to one another and that are secured to one another by a clamp mechanism. Releasably attached to the lower plate is a ballast ring. Also attached to the lower plate is the geophone package consisting of a three component geophone. Attached to the upper plate is a foam buoy. A control package extends down from the upper plate. The control package houses a power source, a seismic data recorder, a compass and a control circuit. An external hard wire electrically connects the control package with the geophone package. The geophone is centrally secured within the geophone package housing along the unit's vertical axis of symmetry. The system does not utilize any hard-wired communications link to the surface monitoring station but utilizes acoustical or preprogrammed means for controlling the unit. When released into the water, the ballast ring is suppose to provide sufficient mass to maintain the system upright and couple the geophones to the ocean floor upon settling. To minimize the likelihood of geophone noise produced by wave or water current motion acting against the buoy and control package, once the system is coupled to the ocean bottom, the clamp mechanism on each leg is released, allowing the control package and buoy to slide upward on the nested legs, isolating the geophones from the other parts of the system.

GeoPro offers a self-contained, i.e., cable-less, OBS system comprised of a 430 mm diameter glass sphere in which is enclosed various components for the system, including batteries, a radio beacon, a seismic data recording unit, an acoustic release system, a deep sea hydrophone and a three component geophone package. The sphere is mounted on a weighted skid that counteracts the buoyancy of the sphere and anchors the OBS system to the sea bed. To minimize noise, the geophone package is centrally positioned at the bottom of the sphere adjacent the skid along the sphere's vertical axis. One drawback to this particular design is that the geophone package is not coupled directly to the ocean floor. Rather, any seismic signal recorded by the geophone must pass through the skid and the bottom of the sphere, and in so doing, are subject to noise and other distortions described above. It should be noted that this unit design is representative of many of the cylinder and sphere shapes utilized in the prior art since it is well known that such shapes are more effective in withstanding the high pressures likely to be found in ocean environments. However, the larger profile of the sphere renders the system highly subject to noise causing ocean currents and similar external forces.

K.U.M. and SEND offer a cable-less OBS system comprising a frame having a rod at the top and forming a tripod at the bottom. A foam flotation device is attached to the rod. An anchor is fixed to the lower portion of the tripod and secures the frame to the sea floor. Pressure cylinders mounted on the tripod portion of the frame contain seismic recorders, batteries and a release system. Also attached to the frame is a pivotally mounted crane arm to which is releasably attached a geophone unit. During deployment, the crane arm is initially maintained in a vertical position with the geophone unit attached to the free end of the arm. When the frame contacts the sea floor, the crane arm pivots out from the frame and releases the geophone unit onto the sea floor approximately 1 meter from the frame system. A hard wire permits electrical communication between the geophone unit and the recorders. The geophone unit itself is an approximately 250 mm diameter, non-symmetrical disk which is flat on one side and domed on the opposite side. The flat side of the geophone unit is grooved and contacts the sea floor when released by the crane arm.

SeaBed Geophysical markets a cable-less OBS system under the name CASE. This system is comprised of a control unit, i.e., electronics package, and a node unit or geophone package interconnected by an external cable. Both the control unit and the node unit are carried on an elongated frame. The control unit is comprised of a tubular body which contains batteries, a clock, a recording unit and a transponder/modem for hydro-acoustic communication with the surface. The node unit is comprised of a three component geophone, a hydrophone, a tilt meter and a replaceable skirt, wherein the skirt forms a downwardly open cylinder under the geophone unit. The three component geophone is centrally fixed in a housing along the housing's vertical axis of symmetry. The node unit is detachable from the elongated frame and control unit, but remains in communication with the control unit via external cabling. The use of a tubular body such as this is very representative of prior art designs because the system packaging must be designed to withstand the high pressures to which the device is exposed. During deployment, the entire unit is dropped to the sea floor, where a remotely operated vehicle (separate from the OBS system) is used to detach the node unit from the frame and plant the node unit into the seafloor, pushing the open-ended skirt into the seafloor sediment.

Each of the referenced prior art devices embodies one or more of the drawbacks of the prior art. For example, the GeoPro is an upright system that has a relatively tall, vertical profile. As such, seismic data collected by this system is subject to noise arising from water movement acting against the devices. In addition, it has been observed that shear motion caused by movement of the ocean floor under such a tall profile OBS system can cause rocking motion of the OBS system, particularly as the motion translates from the bottom to the top of the unit, further deteriorating fidelity of the recorded data. While the OBS system of U.S. Pat. No. 5,189,642, as well as the devices of KUM/SEND and CASE have sensor packages with a lower profile, they only have one geophone in the sensor package and are still subject to some of the afore-mentioned noises.

Thus, it would be desirable to provide a seismic data collection unit that minimizes signal noise arising from rocking motion placed on the unit by water currents and the like. In this same vein, the unit should minimize random noise from external sources and cross-coupling shear energy. Preferably, such a unit will also minimize the impact on signal distortion arising from the physical dimensions of the casing in which the geophones are housed. Similarly, the design options for the unit should be maximized to permit more flexibility in positioning particular components within a casing. Finally, such a unit should minimize the effects of a geophone's harmonic distortion on the detected seismic signal.

SUMMARY OF THE INVENTION

The present invention provides a seismic data collection unit having multiple separate geophones/geophone packages positioned in a housing so as to be offset from the center of gravity of the housing. Specifically, the offset geophones are physically positioned or mathematically configured so as to be symmetrical about a sensor unit's center of gravity in order to cancel out certain noise in a seismic signal. The particular placement of the geophones within the housing are selected so that the net effective center of gravity of the geophones is also the center of gravity of the complete housing containing the geophones. In one embodiment, the geophone housing is disk-shaped and two three-component geophones are positioned 180° apart from one another adjacent the perimeter of the housing. Each geophone set is positioned on a perimeter/circumference that is equidistant from the vertical axis passing through the center of gravity of the unit. In addition, each set of geophones is positioned so that its three component axes are aligned in the same directions as the three component axes of the other geophone set. In another preferred embodiment of the invention, three geophones are positioned adjacent the perimeter wall of the disk-shaped housing so as to be spaced 120° apart from one another.

The geophones are rigidly secured in the housing, which may contain other system components such as a battery, recording device and control mechanisms. The housings may be of any shape although symmetrical shapes, such as disk shape or square shape, are preferable for identifying the center of gravity of the housing. While one embodiment positions each geophone set on a perimeter/circumference that is equidistant from the vertical axis passing through the center of gravity, in another embodiment, geophone sets may be positioned so as to have different linear distances from the vertical axis passing through the center of gravity and/or angular distances from one another. In such case, weighting factors may be applied to the geophones in order to balance their output for "rocking" type noises relative to such vertical axis through the center of gravity of the unit. It should be noted that while it may be simpler in concept and preferable for all the geophones to be set on the same horizontal plane within the unit, it is not necessary. For example, one geophone could be positioned in a horizontal plane "higher" or "lower" than the others and, if desired, corresponding weighting factors determined and applied to balance the summed output response for optimum attenuation of "rocking" type of noise about the center of gravity.

Another added benefit of the concept of this invention is that in summing the outputs (or weighted outputs as the case may be) of multiple geophones within a single casing increases net sensitivity for recording seismic signals over a single geophone. This can be important when recording low level signals in the presence of instrumentation noise.

DESCRIPTION OF THE PREFERRED EMBODIMENTS

In the detailed description of the invention, like numerals are employed to designate like parts throughout. Various items of equipment, such as fasteners, fittings, etc., may be omitted to simplify the description. However, those skilled in the art will realize that such conventional equipment can be employed as desired.

Figure 1:
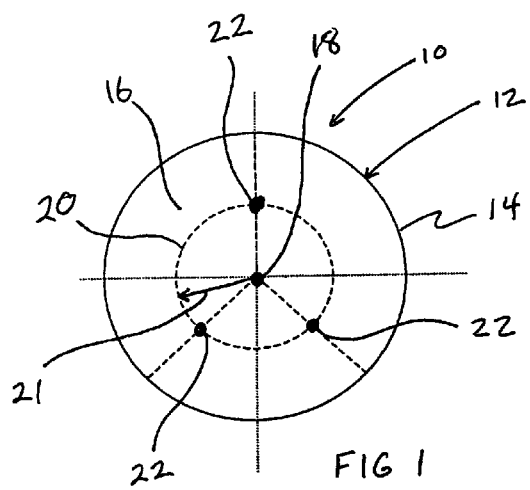
FIG. 1 is a cut-away top view of a circular cross-section of a unit having three geophone packages.

With reference to FIG. 1, there is shown a seismic data collection unit or pod 10 of the invention. Pod 10 is comprised of a case 12 having a wall 14 defining an internal compartment 16. Case 12 is further characterized by a vertical axis 18 passing through the center of gravity and a geophone placement circumference 20 of a selected linear offset distance 21. Disposed within compartment 16 on circumference 20 are three distributed geophone/geophone packages 22 which are secured inside compartment 16 such that pod 10 functions as a rigid structure to which geophones 22 are attached. Utilizing multiple distributed geophones symmetrically positioned as described herein permits the output from the geophones to be summed. Summing multiple sensors in this manner increases net sensor sensitivity and generally improves signal-to-noise for all types of noise conditions, such as external ambient random noises.

Unless specifically indicated, all references to geophones utilized in the invention include conventional geophones, as well as other known devices for detecting seismic wave activity, including without limitation, accelerometers. Furthermore, while geophone 22 may be single component or multi-component, in the preferred embodiment, each geophone 22 is a multi-component geophone package comprised of three geophones configured to detect seismic waves in each of three directions, such as along the x, y and z axes.

In the illustrated preferred embodiment, geophones 22 are disposed on circumference 20 so as to be symmetrical about vertical axis 18. While the angular distance between geophones 22 may vary depending on the number of geophones and the shape of case 12, in this preferred embodiment utilizing three symmetrically spaced geophones, geophones 22 are positioned on circumference 20 so as to be spaced 120° apart from one another with, for example, the z axis parallel to vertical axis 18 and all the x and y axes pointing in the same corresponding directions. In another embodiment utilizing only two geophones, the geophones are spaced 180° apart from one another.

One benefit to the invention apart from the noise attenuation is that the distributed geophone arrangement enhances design flexibility since a geophone can be positioned anywhere in a casing as long as it is correspondingly "balanced" by one or more additional geophones around the center of gravity of the casing. This is in contrast to prior art practice of positioning the geophone package on the vertical axis of symmetry as close as possible to a unit's center of mass and center of buoyancy—a practice that may result in design constraints. More particularly, offset 21 that dictates the size of circumference 20, and hence the position of geophones 22 within unit 10, may be selected based on the various design parameters of unit 10 which may include size, weight distribution, unit profile, optimization of geophone performance, or the presence of other components within case 12. These design parameters are often very restrictive. This is particularly true of SSR units in which geophones are housed in the same case as the other unit components. For example, it is desirable to position heavier system components, such as a unit's batteries (not shown), at the center of buoyancy for an OBS unit. This is not readily accomplished in a one geophone design of the prior art. However, utilizing multiple, symmetrically distributed geophones as described herein, in one configuration of the invention, offset distance 21 may be relatively small in one instance such that geophones 22 are tightly packed around (but still offset from) axis 18, while in another instance, geophone offset distance 21 may be comparatively large so that geophones 22 are positioned on a circumference 20 that is proximate to wall 14. In any event, the ability to adjust the position of the geophones enhances flexibility in a unit's design.

Each set of geophones 22 is secured inside compartment 16 so that a given geophone's directional component is aligned with the corresponding components of the other geophones. For example, the x-axis component of each geophone set points in a first direction, the y-axis component of each geophone points in a second direction while the z-axis component of each geophone points in a third direction.

Those skilled in the art will appreciate that by combining or summing the output of geophones 22 symmetrically dispersed within an OBS unit as described above, much of the noise associated with any one set of geophones will be cancelled out or attenuated. For example, noise associated with "wobble" from shear energy or "rocking" from ocean currents or ground roll from near surface seismic energy, can be attenuated or filtered since the various forms of noise energy will be detected by the dispersed geophones at different times. Furthermore, while it is desirable to symmetrically position the distributed geophones about the vertical axis 18 passing through the center of gravity, it has been found that even multiple distributed geophones within a seismic unit that are not symmetrical about vertical axis 18 still provide some improvement in signal-to-noise result over a single sensor, even if distortion is not completely eliminated.

An additional benefit of the invention is that it reduces noise that might otherwise typically arise from the harmonic distortion that is characteristic of each geophone. Each geophone has a certain amount of harmonic distortion that is uniquely associated with the geophone. This harmonic distortion can add to the noise associated with a received seismic signal. By utilizing multiple, distributed geophones within a single housing in the manner of the invention, the signal component in a particular direction from these geophones will be added in phase while the harmonic distortion of each geophone, being somewhat different, will tend to cancel, thus reducing the net noise effect of harmonic distortion.

Of course, only those geophone components that are most likely to detect the particular type of noise that is the target of the invention need be positioned as described herein. To the extent a geophone will be less likely to detect a certain type of noise, and thus be ineffective in canceling out or attenuating such noise, that geophone's position need not be determined based on the premise of the invention. For example, the vertical component of a geophone may be most affected by seismic noise related to some type of ground roll. Thus, while the various embodiments described above contemplate multi-component geophones in which the vertical and horizontal components of each geophone are grouped together at some position offset from the vertical axis passing through the center of gravity, in another embodiment of the invention, the vertical component of each geophone is offset, preferably adjacent the perimeter of the unit casing, while the horizontal components of each geophone are positioned substantially on vertical axis 18, preferably at the center of gravity of the unit.

Additionally, while the optimum placement of the distributed geophones of the invention within a unit is in a horizontal plane passing through the center of gravity of the unit, the geophones may also be positioned in a horizontal plane offset from the center of gravity, such as near the periphery of a horizontal side of the unit. Because of their horizontal symmetry around the vertical axis 18 passing through the center of gravity, the filtering or attenuation of noise as taught by the invention is still effective. In contrast, any movement of a prior art geophone or geophone package away from the center of gravity, even if it is otherwise along the vertical axis passing through the center of gravity, will be subject to the type of noise eliminated by the design of the current invention.

Figure 2:
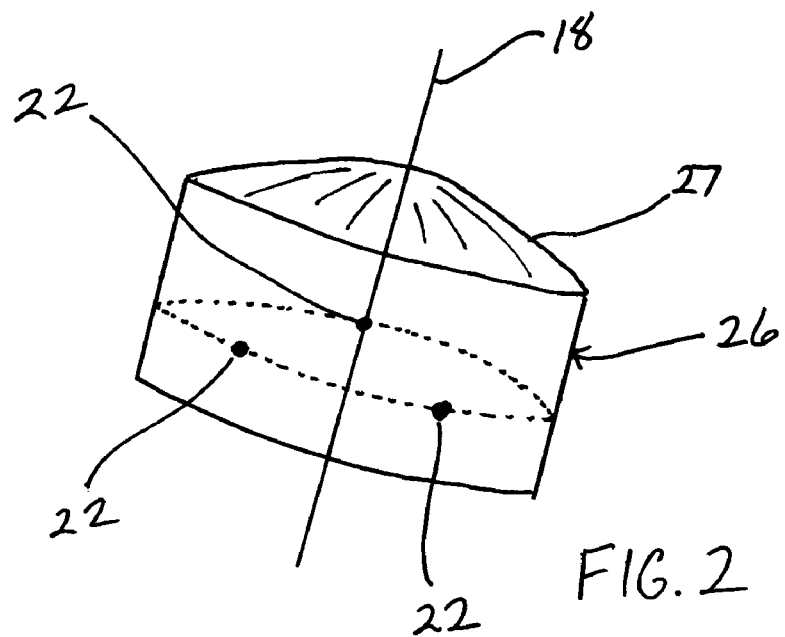
FIG. 2 is an elevated partial cut-away view of a disk shaped case of FIG. 1.
Figure 3:
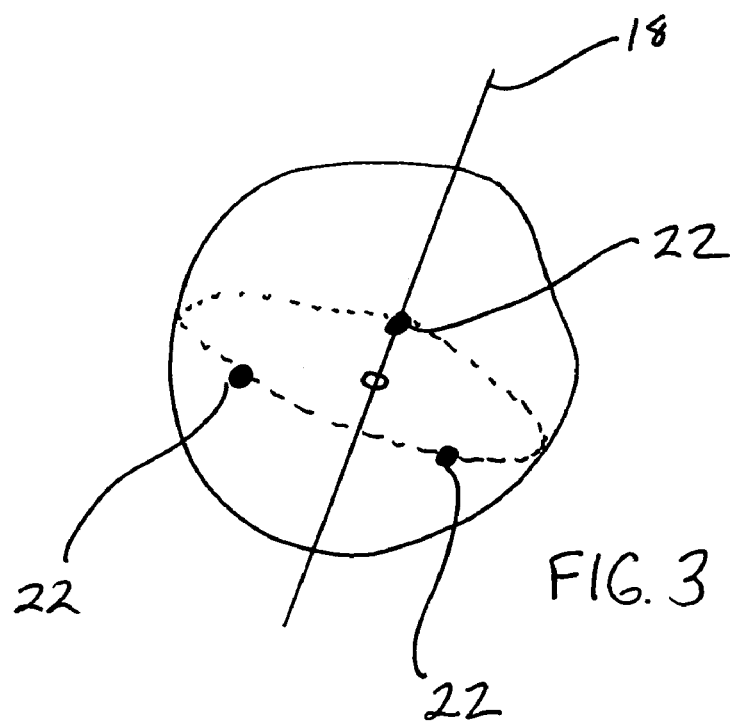
FIG. 3 is an elevated partial cut-away view of a spherical shaped case of FIG. 1.

Finally, the case 12 illustrated in FIG. 1 is a cross-section of a circular shaped case, such as the disk-shaped unit 26 having a convex side 27 illustrated in FIG. 2 or the spherical shaped case 28 illustrated in FIG. 3. However, the distributed geophones of the invention can be utilized in any type of seismic detection unit having any shape case.

Figure 4:
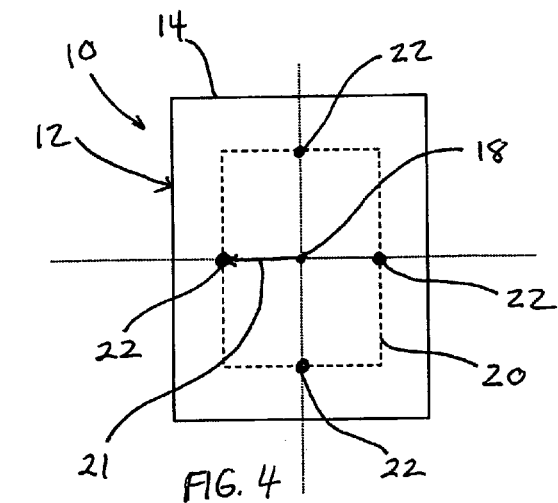
FIG. 4 is a cut-away top view of a rectangular cross-section of a unit having four geophone packages.

Turning to FIG. 4, another embodiment of the invention is illustrated in which shown cross-section of case 12 has four sides and is rectangular in shape. In this embodiment, four geophones 22 are positioned around the vertical axis 18 passing through the center of gravity of case 12. Circumference 20 is square in shape such that the offset distance 21 of each geophone 22 is equidistance from vertical axis 18. While true of any shape case with any number of sides, in the particular configuration of FIG. 4, case 12 could be of any four-sided shape, whether rectangular, square or otherwise, as long as the geophones are symmetrically arranged about vertical axis 18.

Figure 5:
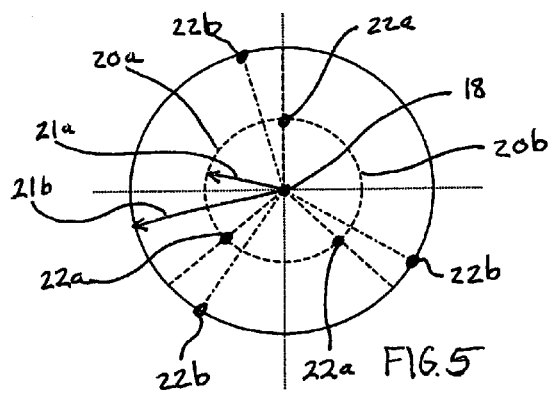
FIG. 5 is cut-away top view of a circular cross-section of a unit having six geophone packages symmetrically fixed at two different offset distances.

In FIG. 5, there is shown a disk shaped unit 10 of the invention in which six geophones 22 are symmetrically fixed at two different offset distances 21, i.e., there are multiple peripheries at which geophones are attached. Specifically, a first set of geophones 22a is symmetrically arranged on a first circumference 20a about vertical axis 18 while a second set of geophones 22b is symmetrically arranged on a second circumference 20b about vertical axis 18 passing through the center of gravity. In this embodiment, the offset distance 21a of the first set of geophones 22a is less than the offset distance 21b of the second set of geophones 22b. As illustrated, each set of geophones 22a, 22b need not be symmetrically arranged with respect to each other so long as each set of geophones 22a, 22b is symmetrical about vertical axis 18.

Figure 6:
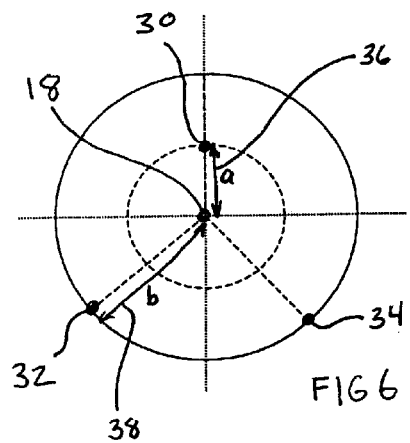
FIG. 6 is cut-away top view of circular cross-section of a unit having three geophone packages of varying distance from the vertical axis passing through the center of gravity.

Shown in FIG. 6 is a disk shaped unit 10 having three geophone packages 30, 32, 34 of varying offset distance from vertical axis 18 passing through the center of gravity. Each geophone 30, 32, 34 has a weighted value, $w_{30}$, $w_{32}$, $w_{34}$, respectively, assigned to it and the weighting value is applied to the geophone output in order to balance the respective outputs relative to the vertical axis 18 passing through the center of gravity. In this particular embodiment, the geophones are all angularly symmetrical about vertical axis 18, such that the weighted values only need account for a variation between offset distance "a" 36 and offset distance "b" 38. The respective weighted values for each geophone in such a configuration may be determined according to the following formula:

$$w_{30}=b/a; \ w_{32}=1; \ w_{34}=1.$$

Figure 7:
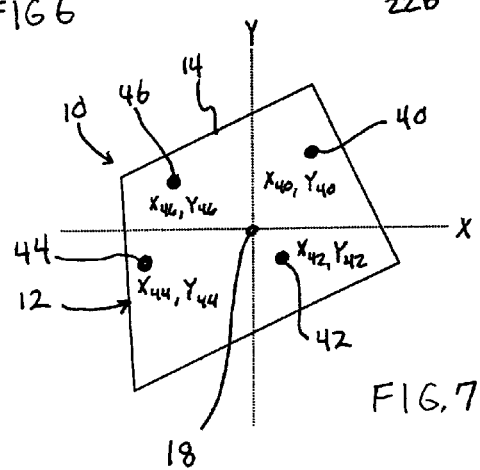
FIG. 7 is a cut-away top view of an arbitrary shaped unit having four geophone packages of varying distance and angle from the vertical axis passing through the center of gravity of the total unit.

FIG. 7 illustrates a generalized embodiment of the invention for a unit 10 in which the wall 14 defining the interior compartment of case 12 has an irregular arbitrary shape. A vertical axis 18 passes through the origin of the x-y-z coordinate system at the center of gravity of the unit so that the x-y plane represents a horizontal plane through the unit and the z axis is collinear with vertical axis 18. Geophones 40, 42, 44, 46 are shown spaced around the vertical axis 18 showing their corresponding coordinate positions $x_{40}$, $y_{40}$; $x_{42}$, $y_{42}$; $x_{44}$, $y_{44}$; $x_{46}$, $y_{46}$. Each geophone has a weighted value $w_{40}$, $w_{42}$, $w_{44}$, $w_{46}$ assigned to it so that when the weighting value is applied to the corresponding geophone's response, the summed response will be balanced about the origin center of gravity for optimum attenuation of "rocking" type noise about the center of gravity. The weighting values should be selected so that the following equations are satisfied:

$$x_{40}w_{40}+x_{42}w_{42}+x_{44}w_{44}+x_{46}w_{46}=0;$$

$$y_{40}w_{40}+y_{42}W_{42}+y_{44}w_{44}+y_{46}W_{46}=0.$$

One way to satisfy the above set of equations is to set w40 and w42 equal to unity (1) and solving the resulting set of equations for w44 and w46. Doing this results in the following solution:

$$w_{40}=1;\ w_{42}=1;$$

$$w_{44}=[x_{46}(y_{40}+y_{42})-y_{46}(x_{40}+x_{42})]/(x_{44}y_{46}+y_{44}x_{46});$$

$$w_{46}=[y_{44}(x_{40}+x_{42})-x_{44}(y_{40}+y_{42})]/(x_{44}Y_{46}+y_{44}x_{46}).$$

For seismic data collection units or pods utilized in deep water, case 12 is preferably sealable so as to form a watertight compartment 16. To the extent case 12 houses other components, such components may include a clock, a power source, a control mechanism and a seismic data recorder. The invention is particularly desirable in such case because it permits flexibility in arranging these various components within the limited confines of case 12. In any event, such a unit is desirable because it requires no external communication or control in order to record seismic signals. Likewise, because the multiple, distributed geophones are internally mounted within case 12 no external wiring or connection is necessary.

While a seismic data collection pod or unit with multiple distributed geophones is particularly suited for deep water activities, it is also applicable for use with seismic units deployed on land or in shallow water or transition zones. In either case, such an arrangement is useful in attenuating or filtering noise from the surrounding environment. Of course, in the case of a unit deployed on land, such noise may arise from sources such as wind, weather, man made or even animals rather than ocean currents and other noise sources uniquely attributable to an ocean environment.

There is no instance in the prior art where geophones for seismic detection are separated or dispersed within a single housing. In all known instance, there is only a single geophone generally positioned at the geometric center of the housing. Even to the extent the prior art may have a multi-component geophone package, the geophones are all grouped together at one location within the housing, again generally at the geometric center of the housing or at least along the vertical axis of symmetry. In addition, since there is no teaching of multiple geophones in the prior art, there is also no teaching of symmetrically positioning multiple distributed geophones around, but offset from a housing's vertical axis passing through the center of gravity.

While certain features and embodiments of the invention have been described in detail herein, it will be readily understood that the invention encompasses all modifications and enhancements within the scope and spirit of the following claims.

What is claimed is:

1. A seismic data collection unit comprising:
   a. a water tight case having a wall defining an internal compartment, wherein the case is substantially symmetrical about an axis of symmetry so as to define a center of gravity for said case along said axis;
   b. at least two geophones disposed within said case, wherein each geophone is offset from said axis by a first offset distance and each geophone is offset from one another;
   c. a clock disposed within said case;
   d. a power source disposed within said case; and
   e. a seismic data recorder disposed within said case;
   f. wherein said case is disk-shaped and is formed of two parallel, circular plates joined along their peripheries by said wall and said axis of symmetry passes through the center of each of said plates.

2. The unit of claim 1, wherein the offset distance for each geophone is equivalent.

3. The unit of claim 2, further having a circumference defined in said compartment about the vertical axis, wherein the circumference has a radius equivalent to the offset distance and wherein said geophones are disposed on said circumference.

4. The unit of claim 3, wherein the geophones are symmetrically spaced on said circumference.

5. The unit of claim 4, wherein the unit has two geophones that are symmetrically spaced 180 degrees apart on said circumference.

6. The unit of claim 4, wherein the unit has three geophones that are symmetrically spaced 120 degrees apart on said circumference.

7. The unit of claim 4, wherein the unit has four geophones that are symmetrically spaced 90 degrees apart on said circumference.

8. The unit of claim 2 further having a periphery defined in said compartment about the vertical axis, wherein the periphery is characterized by at least one side which is offset from said vertical axis a distance equivalent to the offset distance, and wherein said geophones are disposed on said periphery.

9. The unit of claim 8, wherein one of said sides is convex.

10. The unit of claim 1 wherein said geophones are rigidly attached within said case between said plates.

11. The unit of claim 1 wherein said geophone are rigidly attached in said internal compartment adjacent the periphery of said plates.

12. The unit of claim 1, further defining a horizontal plane, wherein said geophones are rigidly attached in the same horizontal plane.

13. The unit of claim 1 wherein said geophones are attached adjacent said wall.

14. The unit of claim 1, wherein each unit is characterized by a horizontal x-axis, a horizontal y-axis and a vertical z-axis and wherein each geophone is attached in said internal compartment so that each geophone axis is aligned with the corresponding axis of the other geophone.

15. The unit of claim 14 wherein one component of said geophone capable of measuring along said z axis is disposed along said vertical axis and wherein said other components of said geophone capable of measuring in a horizontal axis are offset from said vertical axis.

16. The unit of claim 1 wherein the geophones are accelerometers.

17. The unit of claim 1 further comprising an additional geophone dispersed in said case along said vertical axis.

18. The unit of claim 1, wherein said case has a center of gravity and said vertical axis passes through said center of gravity.

19. The unit of claim 1 wherein said case has a center of gravity with said vertical axis passing therethrough and said internal compartment is bounded by an outer periphery which is a first distance from said axis, said offset distance of said geophones being at least 10% of said first distance.

20. The unit of claim 19 wherein said offset distance is at least 25% of said first distance.

21. The unit of claim 1, further comprising at least two geophones on a circumference, wherein each geophone on a circumference is symmetrically spaced apart from the other geophone on said circumference.

22. The unit of claim 1, further comprising at least three geophones on each circumference, wherein each geophone on a circumference is symmetrically spaced thereon 120° apart from the other geophone on said circumference.

23. The unit of claim 1 further comprising at least two additional geophones, wherein each additional geophone is offset from said vertical axis by a second offset distance, said second offset distance being different from said first offset distance.

24. The unit of claim 23, wherein at least three geophones are symmetrically spaced apart from one another on one circumference and at least three geophones are symmetrically spaced apart from one another on the other circumference.

* * * * *